June 15, 1926.
H. C. BRUNNEL
1,588,655
INSULATED STEEL STRUCTURE
Filed May 23, 1924      4 Sheets-Sheet 1
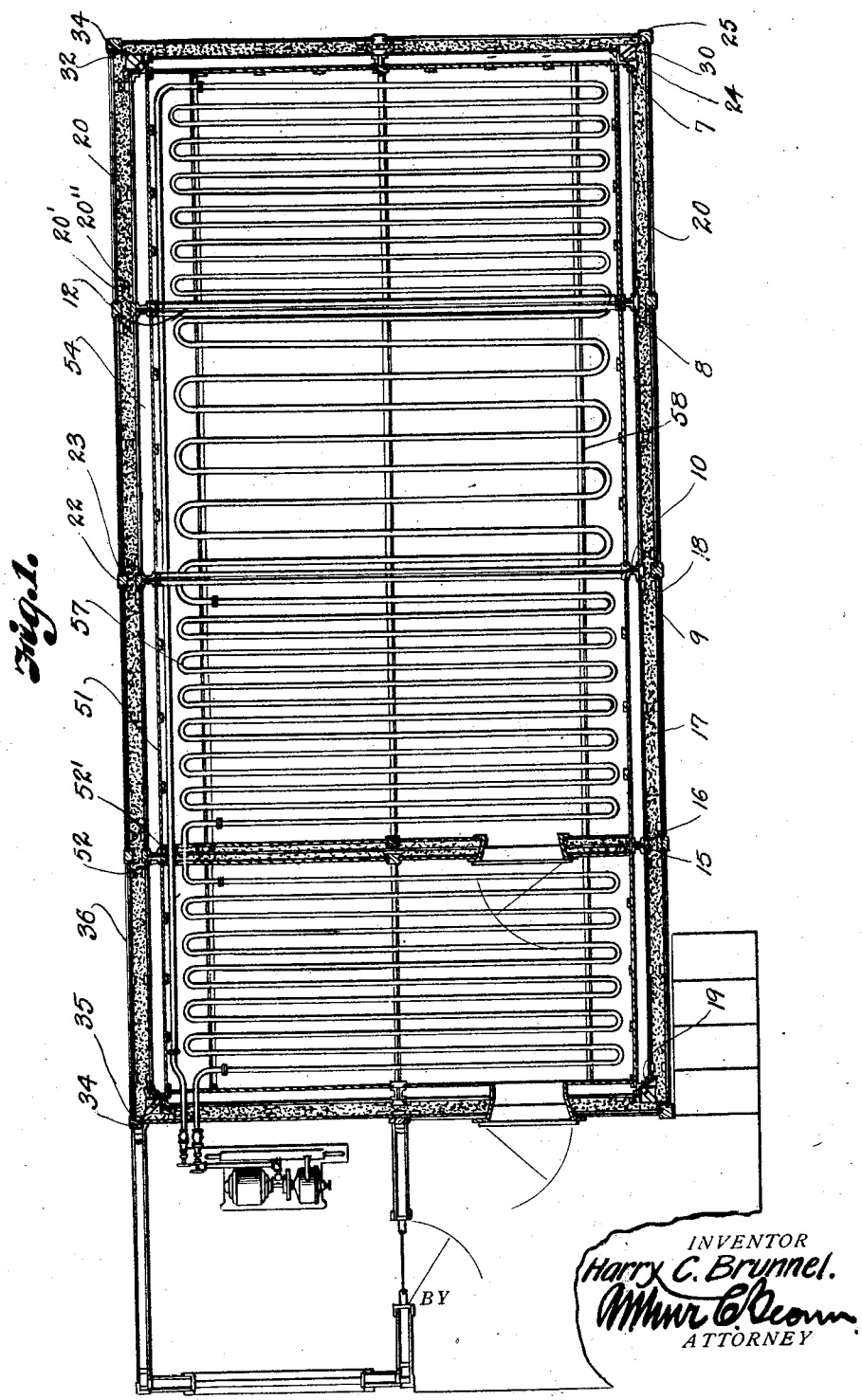
INVENTOR
Harry C. Brunnel.
BY
ATTORNEY June 15, 1926.  
H. C. BRUNNEL  
INSULATED STEEL STRUCTURE  
Filed May 23, 1924
1,588,655
4 Sheets-Sheet 2
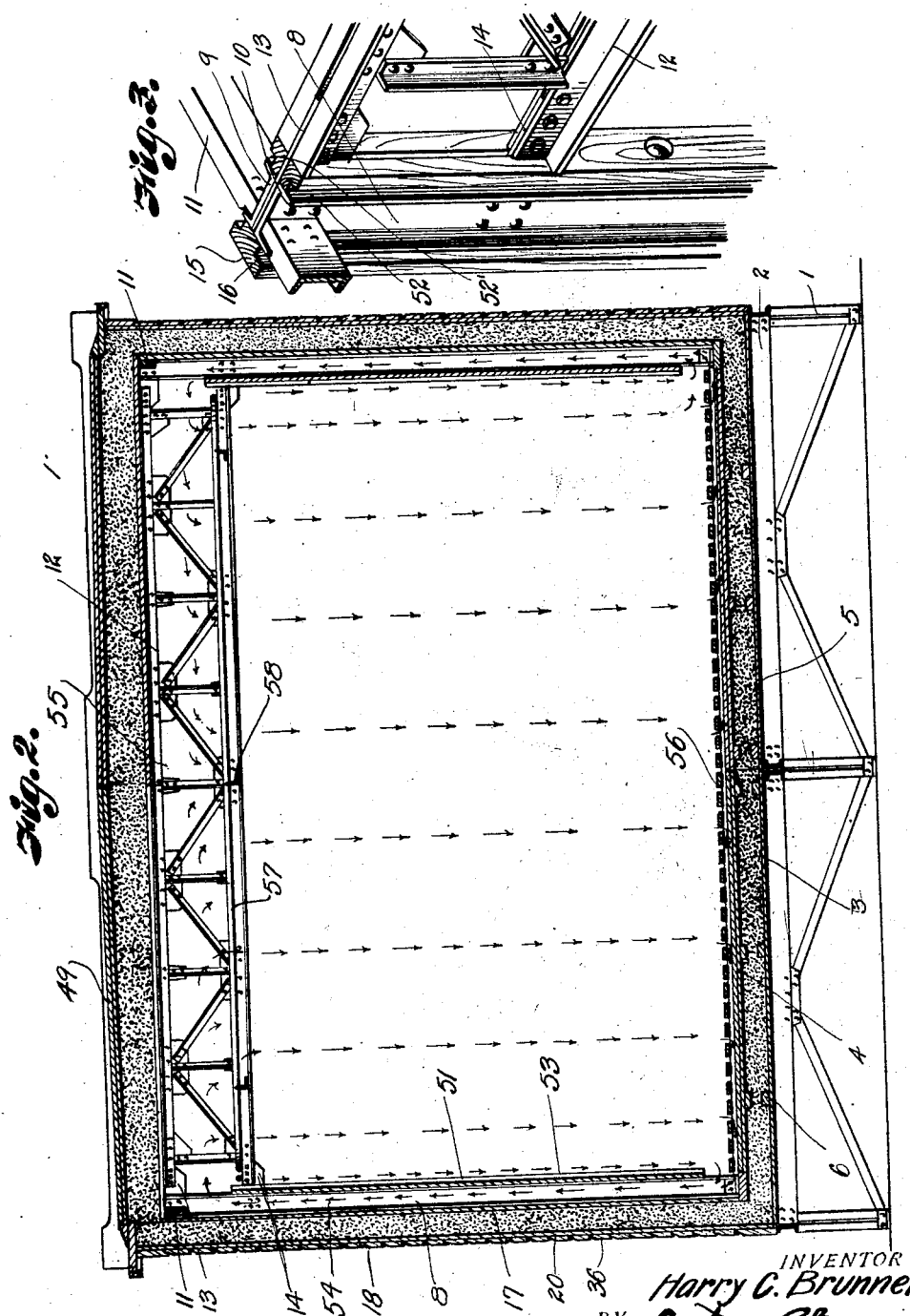
INVENTOR  
Harry C. Brunnel.  
BY  
ATTORNEY

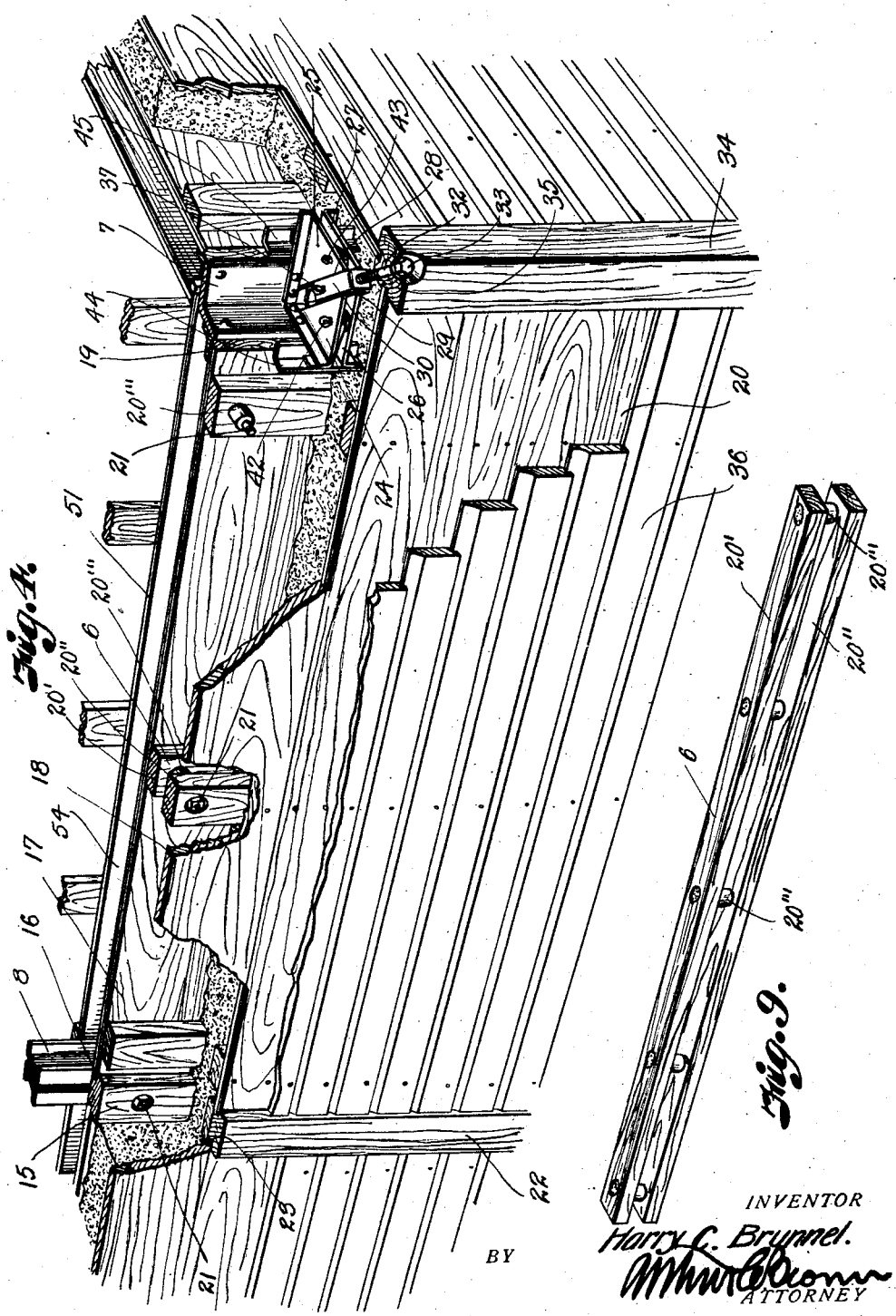

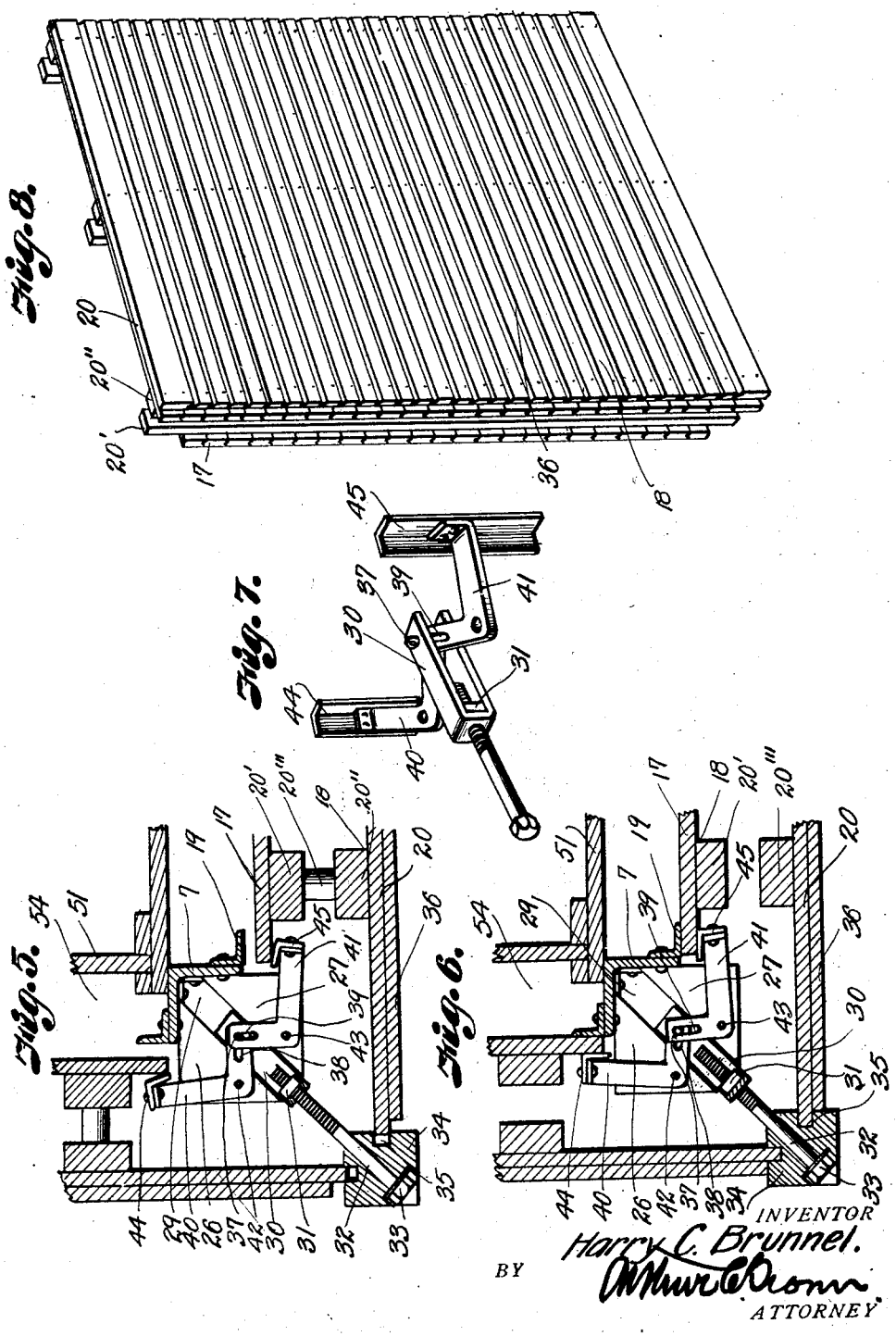

Patented June 15, 1926.

1,588,655

UNITED STATES PATENT OFFICE.

HARRY C. BRUNNEL, OF LITTLE ROCK, ARKANSAS.

INSULATED STEEL STRUCTURE.

Application filed May 23, 1924. Serial No. 715,333.

This invention relates to insulated steel structures and the primary object thereof is to provide an insulated steel structure which can be fabricated at a plant or factory and shipped in a knock down condition to be set up in an expeditious and convenient manner, the structure being so arranged that the necessity for nails or special equipment distinct from the structure itself will be entirely eliminated.

While the invention contemplates a steel structure adapted for multitudinous uses, it particularly lends itself for use as a storage building for ice so that the ice can be temporarily stored for distribution. The distributing stations of many ice plants are distributed over a relatively wide area. The ice is transported from the ice plant to the distributing stations and temporarily stored preparatory to local distribution. Unless adequate facilities are provided for storing the ice at the distributing stations, a considerable loss results on account of the ice melting while in local storage. Some storage buildings resort to local refrigeration, that is a coil of pipe is included in the storage building to maintain the temperature in the building low enough to prevent ice from melting. While this assists in solving the problem, the efficiency of such an arrangement depends largely, if not wholly upon the insulating efficiency of the building in which the ice is stored. Obviously such a building must be inexpensive to construct and must possess high insulating efficiency in order to give the best results.

My invention contemplates such a building in which the interior will be thoroughly insulated from radiation of heat in the outside atmosphere. The building is constructed in units at the plant and shipped, ready to be set up preferably upon a base and in such a manner that the building can be taken down in the event it is desired to move it to a new location. The building or structure may also be used as a storage for perishable goods or mechandise, but as above explained, it is primarily intended as a local storing and distributing building for ice.

The novel construction of the invention will be apparent by reference to the following description in connection with the accompanying drawings, in which Fig. 1 is a horizontal sectional view of an insulated steel structure constructed in accordance with my invention.

Fig. 2 is a vertical cross sectional view through the structure.

Fig. 3 is a fragmentary perspective view of one column and a truss showing the manner of connecting them.

Fig. 4 is a fragmentary perspective view of the corner of the structure, particularly illustrating one of the tying-in devices.

Fig. 5 is a plan view of the tying-in device showing the position of the parts preparatory to bringing the sections into place.

Fig. 6 is a similar view showing the parts in final position.

Fig. 7 is a perspective view of the parts of the tying-in device detached.

Fig. 8 is a perspective view of one wall section or unit, and

Fig. 9 is a detailed perspective view of one of the studding units.

The building is set up by first providing a suitable base, preferably of structural steel consisting of legs 1 and base sills 2. Upon the base is placed the bottom or floor consisting of floor sections, each of which comprises a bottom layer 3 of lumber, preferably covered with water proof paper, with one or more upper layers 4 of lumber lined with paper and a layer of cork 5 between them. In actual practice, I recommend a plurality of upper layers, although ordinarily one lower layer of lumber will be sufficient. In order to maintain proper distances between the layers 3 and 4, I use spacers consisting of insulated studding members 6, see Fig. 4, the upper and lower layers and the studding being bolted together in any well known manner.

The floor or bottom is constructed at the factory or plant in units minus the cork, the cork being let in at the time the building is erected. A steel frame is now erected upon the floor. The steel frame may consist of corner columns 7, each comprising an angle. The corner columns are connected to center columns or intermediate columns 8, each intermediate column consisting of two channels 9 and 10 arranged back to back and fastened to the corner columns by girts 11 of channel form. The intermediate columns are supported upon the floor by an ordinary angle base. The intermediate columns are connected at their upper portions in pairs by cross trusses 12 fabricated to allow an air circulation therethrough, the trusses being supported upon the plates 13 and 14 riveted to the center columns as shown. The frame is now complete.

Bolted to the center columns are rabbeted members 15 to provide recesses or grooves 16 to receive the vertical edges of the inner panel 17 of the insulating wall sections 18, the panel section at the corner column being shown as fastened by an angle 19 on its inner face and by a tying-in device at its outer face; the tying-in device being referred to in detail hereinafter. It is to be understood that the wall is made up of a plurality of sections or units each including an inner panel 17 and an outer panel 20 spaced apart by studding members 20′ and 20″, themselves held in spaced relation by spacers 20‴ through which the bolts 21 project to hold the units together. The spacers should be of some material of poor conductivity and for this purpose, I recommend edge grain high pitch content yellow heart wood, the unit thus constructed as an unbroken insulated space between the inner and outer panels to be filled with suitable insulating material, for example granulated cork, after the wall sections or units are set up. The wall sections or units are formed at the plant or factory and are shipped complete except for the cork which is flowed into the space between the inner and outer panels before the roof is put on.

22 designates finish strips having edge grooves 23 to receive the vertical edges of the outer panels 20 of the wall units. After the four walls are set up they must be made into a tight rigid unitary structure. This is accomplished by tying-in devices of which there are a plurality (preferably 4) at each corner column. Each tying-in device consists of brackets fastened to the corner columns and an operating mechanism to force the units in place. As the device contemplated by this invention will be fabricated at a steel plant, I prefer to make the brackets of angle plates 24, 25, 26 and 27, the plates 24 and 25 being complementary one to the other with a space or slot 28 between them to align with a similar slot 29 between the complementary plates 26 and 27. In the slots 28 and 29, which for a structural purpose may be considered a single slot, is a U-shaped yoke or lever actuating member 30 having longitudinal movement between the edges of the brackets and in the yoke is a nut 31 receiving a jack screw 32 having a head 33 which abuts against the corner post 34 having shoulders 35 to in turn abut against the edges of the sheathing 36 and the outer panel 20.

The inner end of the yoke 30 carries a pin 37 in slots 38 and 39 in the elbow levers 40 and 41 which are pivoted to the bracket plates at 42 and 43 so the elbow levers can rock when the yoke has longitudinal movement imparted to it. The free ends of the levers 40 and 41 are provided with jaws 44 and 45 shown as angles which bear against the edges of the inner panel of the units 18 to force them into place and hold them so that the units are tied in to their complementary members.

It will be apparent that the levers of the tying-in members exert a powerful toggle action upon the units to cause them to be forced into place and to hold the structure rigid and intact.

The roof 49 is supported from the steel frame to complete the structure and except as to dimensions is like the floor sections or units. As previously explained, the floor units, the wall units and the roof units are shipped from the plant or factory without the cork between the panels. During erection, the top panel of the floor section is removed and granulated cork is laid on top of the bottom layer or panel, then the top layer or layers are bolted in place. The wall sections are set up intact, and granulated cork is flowed or poured into the space between the inner and outer panels. When the roof sections are put on, the bottom panels are first laid in place, granulated cork is laid on them and then the top panels are bolted in place, it being understood of course that while the units are bolted together when they leave the plant they are so bolted that the top panels can be removed for the application of the cork and they are finally secured during the erection of the building. When the roof is put on, roofing paper is cemented over the roof.

The interior finish is now put in place. The baffle plates 51 are fastened in the grooves 52 and 52′ in the rabbeted members 53 carried by the columns so that there is a space 54 between the inner panels of the wall units and the baffles to space the ice away from the inner panels of the insulated wall units, thereby creating a flue for carrying warm air to the bunker space 55 at the top of the building. Crating straps 56 may now be applied to the floor. The building is now complete except for the doors which may be fastened in any approved manner.

The building may or may not employ refrigerating coils, but if refrigerating coils are used, those like 57 are recommended and they may be supported by the pipe struts 58 attached to the lower cords of the trusses 12, the coils being supplied with refrigerating fluid in any well known manner. I make no specific claim to the use of the coils or for materially supplying refrigerating fluid to them because where refrigeration is required in the building, I will avail myself of the most efficient refrigerating plant adapted for the purpose.

It will be apparent from the foregoing that the entire insulated steel structure can be fabricated at a plant or factory and shipped in units to the erection location and quickly set up. It will also be apparent that by constructing the wall units as above described, that an unbroken insulated space is provided between the inner and outer panels of the wall units so as to practically eliminate any possibility of heat conductivity or radiation from the exterior of the building to the interior of the building. Consequently refrigeration losses will be reduced to a minimum, if not wholly eliminated.

What I claim and desire to secure by Letters-Patent is:

1. An insulated steel structure comprising co-operating unitary members fashioned so that when brought together they will constitute the finished structure, the members including a base, a sectional floor having bolted upper and lower panels with insulating material between them, corner columns and intermediate columns supported by the base, girts for fastening the corner columns to the intermediate columns, side wall panels having spaced inner and outer panels, studs between the inner and outer panels in spaced relation, spacers between the studs, the spacers consisting of material of poor thermal conductivity, the wall units interlocking with the intermediate columns and corner columns, the spaces between the inner and outer layers of the wall section being unbroken except for the spacers, insulating material in the spaces between the inner and outer panels of the wall units, tying-in and positioning members connected to the corner columns and exerting endwise pressure against the wall units to hold them in functional positions and a roof structure supported by columns, the roof structure including roof units, each comprising a lower panel and an upper panel with insulating material between them.

2. A knock down insulated steel structure comprising a base, a steel frame on the base consisting of corner columns and intermediate columns, wall units interlocking with the columns to close the spaces between them, said wall units consisting of inner panels and outer panels with spaces between them, a floor consisting of upper and lower panels with spaces between them and a roof structure consisting of upper and lower panels with a space between them, the floor spaces, the wall spaces and the roof spaces communicating and having insulating material therein to provide a substantially unbroken insulated space on the bottom, top and side walls of the building.

3. An insulated steel structure comprising a base, vertical end columns, vertical intermediate columns, the columns being fastened to the base, wall engaging means on the vertical columns, removable wall sections secured to the columns by said means, the wall sections consisting of units, each unit having an inner wall and outer wall, studs between the inner and outer walls and insulating spaces between the studs, similar insulated units on the floor and like insulated units supported by the columns to provide a roof.

4. An insulated steel structure comprising a steel base, vertical columns on the base, girts connecting the columns, a truss connecting intermediate columns in pairs, rabbeted members on certain vertical columns cooperating therewith to form grooves, insulated floor members on the base, insulated wall members engaging the grooves of the columns having them, means for securing the wall members to the columns not provided with the grooves, an insulated roof for said structure.

5. An insulated steel structure comprising a base, vertical columns carried by the base, girts securing the columns together, means for connecting certain of the columns in pairs, said means comprising trusses, floor members, wall units, the wall units having edges to engage the intermediate columns and tying-in devices carried by the corner columns for forcing the wall units into place and an insulated roof for said structure.

6. An insulated steel structure comprising a base, vertical columns carried by the base, girts securing the columns together, means for connecting certain of the columns in pairs, said means comprising trusses, floor members, wall units, the wall units having edges to engage the intermediate columns and tying-in devices carried by the corner columns for forcing the wall units into place, the tying-in members comprising toggle levers, brackets supporting the toggle levers fastened to the corner columns, jaws on the toggle levers for exerting pressure against the edges of the wall units, means for actuating the toggle levers and an insulated roof for said structure.

7. An insulated steel structure comprising a base, vertical columns carried by the base, girts securing the columns together, means for connecting certain of the columns in pairs, said means comprising trusses, floor members, wall units, the wall units having edges to engage the intermediate columns and tying-in devices carried by the corner columns for forcing the wall units into place, the tying-in members comprising toggle levers, brackets supporting the toggle levers fastened to the corner columns, jaws on the toggle levers for exerting pressure against the edges of the wall units, means for actuating the toggle levers, said means comprising a jack screw and yoke, the yoke having lost play connection with the toggle levers, and an insulated roof for said structure.

8. In an insulated steel structure, side wall units having spaced inner and outer panels, studs between the inner and outer panels in spaced relation, spacers between the studs, the spacers consisting of material of poor conductivity.

9. In an insulated steel structure, side wall units having spaced inner and outer panels, studs between the inner and outer panels in spaced relation, spacers between the studs, the spacers consisting of material of poor conductivity, intermediate columns and corner columns with which the wall units interlock, the spaces between the inner and outer panels of the wall units being unbroken except for the spacers, insulating material between the inner and outer panels of the wall units, and tying-in members connected to the corner columns and exerting endwise pressure against the wall units to hold them in functional position.

10. In an insulated steel structure, side wall units having spaced inner and outer panels, studs between the inner and outer panels in spaced relation, spacers between the studs, the spacers consisting of material of poor conductivity, intermediate columns and corner columns with which the wall units interlock, the spaces between the inner and outer panels of the wall units being unbroken except for the spacers, insulating material between the inner and outer panels of the wall units, tying-in members connected to the corner columns and exerting endwise pressure against the wall units to hold them in functional position, and girts fastening the corner columns to the intermediate columns.

In testimony whereof I affix my signature.

HARRY C. BRUNNEL.